July 16, 1957

A. Z. GUTTERMAN 2,799,820

THYRATRON MOTOR CONTROL CIRCUIT

Filed May 18, 1955

INVENTOR.
ARTHUR Z. GUTTERMAN
BY James S. Shannon
AGENT
Wade Loority
ATTORNEY

United States Patent Office 2,799,820
Patented July 16, 1957

2,799,820

THYRATRON MOTOR CONTROL CIRCUIT

Arthur Z. Gutterman, New Rochelle, N. Y., assignor to the United States of America as represented by the Secretary of the Air Force Application May 18, 1955, Serial No. 509,434

1 Claim. (Cl. 318—345)

This invention relates to thyratron controlled direct current motors and has as its object an improvement in torque characteristic and an increase in smoothness of operation of such motors by eliminating the inductive transients in the system caused by the motor reactance. These transients cause improper firing of the thyratrons by producing voltage surges on the thyratron cathodes. Their elimination, in accordance with the invention, is accomplished by shunting the motor with a network such that the composite load of motor and network on the thyratrons is a pure resistance at all frequencies. Since transient phenomena contain components of all frequencies, the elimination of inductive transients due to motor reactance requires that the inductive reactance of the motor be cancelled at all frequencies.

Figure 1:
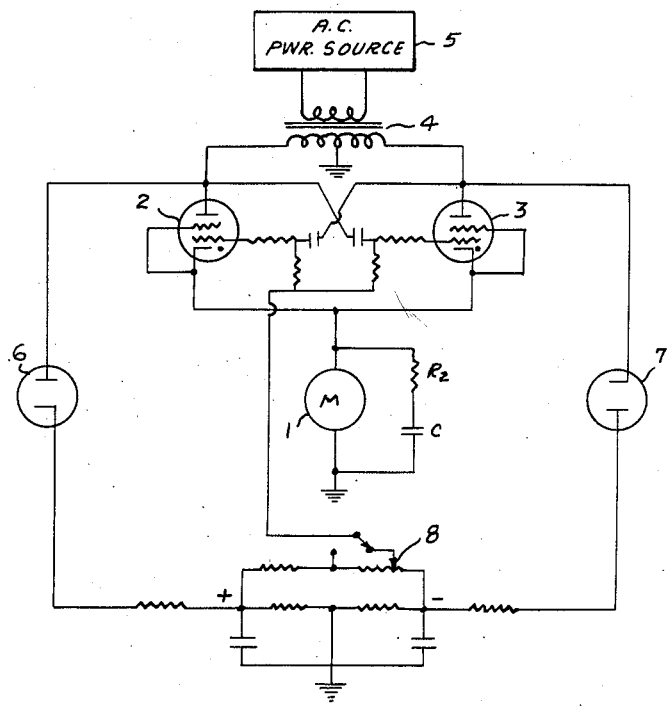
Figure 2:
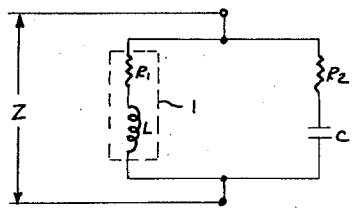

A more detailed description of the invention will be made in connection with the specific embodiment thereof shown in the accompanying drawings in which Fig. 1 is the schematic diagram of a thyratron motor control circuit with the motor shunted by a network in accordance with the invention; and Fig. 2 is the equivalent diagram of the composite load formed by the motor and the shunting network.

Referring to Fig. 1 a direct current motor 1, which may be any of the types commonly used with thyratron control such as series motors, permanent magnet or separately excited field shunt motors, etc., is energized through thyratrons 2 and 3 from the secondary of transformer 4, the primary of which is fed from alternating current power source 5. The thyratrons act as full wave rectifiers supplying direct current to the motor, the average value of which is determined by the firing angle of the thyratrons which in turn is determined by the direct voltage bias on the control grids. This bias is supplied by rectifiers 6 and 7 and its value is adjustable at movable tap 8. Thyratron control circuits of this type are more or less conventional in the art.

It is apparent from Fig. 1 that if the load connected between the thyratron cathodes and ground is inductive any change in energization of the load will produce a self induced transient voltage in the load opposing the change in the manner characteristic of inductive reactance. This transient appears between the grids and cathodes of the thyratrons in series with the control voltage from point 8 and therefore, during the presence of the transient, changes the firing angle of the thyratrons from that normally corresponding to the voltage at point 8. This transient and its effect on thyratron firing angle is eliminated if the load is a pure resistance.

In order to have a pure resistance load on the thyratrons the motor 1 is shunted by a network consisting of resistance $R_2$ and capacitance $C$ connected in series. The composite load presented to the thyratrons by the motor and shunting network is illustrated in Fig. 2, the motor 1 being replaced by its equivalent circuit, $R_1$ in series with $L$. If the conditions $$R_1 = R_2$$

and $$R_1 C = \frac{L}{R_2}$$

are met the impedance $Z$ of the network is a pure resistance at all frequencies. This may be demonstrated as follows:

Assume $$R_1 = R_2 = R$$

and $$R_1 C = \frac{L}{R_2}, \text{ or } \frac{L}{C} = R^2$$

Then $$Z = \frac{(R_1 + j\omega L)\left(R_2 + \frac{1}{j\omega C}\right)}{R_1 + j\omega L + R_2 + \frac{1}{j\omega C}}$$

$$= \frac{R^2 + \frac{L}{C} + j\left(\omega L - \frac{1}{\omega C}\right)R}{2R + j\left(\omega L - \frac{1}{\omega C}\right)}$$

since $$\frac{L}{C} = R^2$$

$$Z = R \frac{2R + j\left(\omega L - \frac{1}{\omega C}\right)}{2R + j\left(\omega L - \frac{1}{\omega C}\right)} = R$$

I claim:

A control circuit for a direct current motor having an equivalent electrical circuit consisting of a resistance and an inductance connected in series, said control circuit comprising: a source of alternating current power, a thyratron rectifier connected between said power source and said motor for supplying direct current to said motor, means associated with said thyratron rectifier for controlling its output current, and a network consisting of a resistance and a capacitance connected in shunt to said motor, the resistance in said network being equal to the resistance in the equivalent circuit of said motor and the capacitance in said network being equal to the inductance of said equivalent circuit divided by the square of the resistance in said network.

References Cited in the file of this patent

UNITED STATES PATENTS 2,528,688    Chin et al. _____ Nov. 7, 1950